No. 672,073. Patented Apr. 16, 1901.
H. L. WARNER.
PNEUMATIC TIRE FOR VEHICLES.
(Application filed Sept. 27, 1900.)
(No Model.)
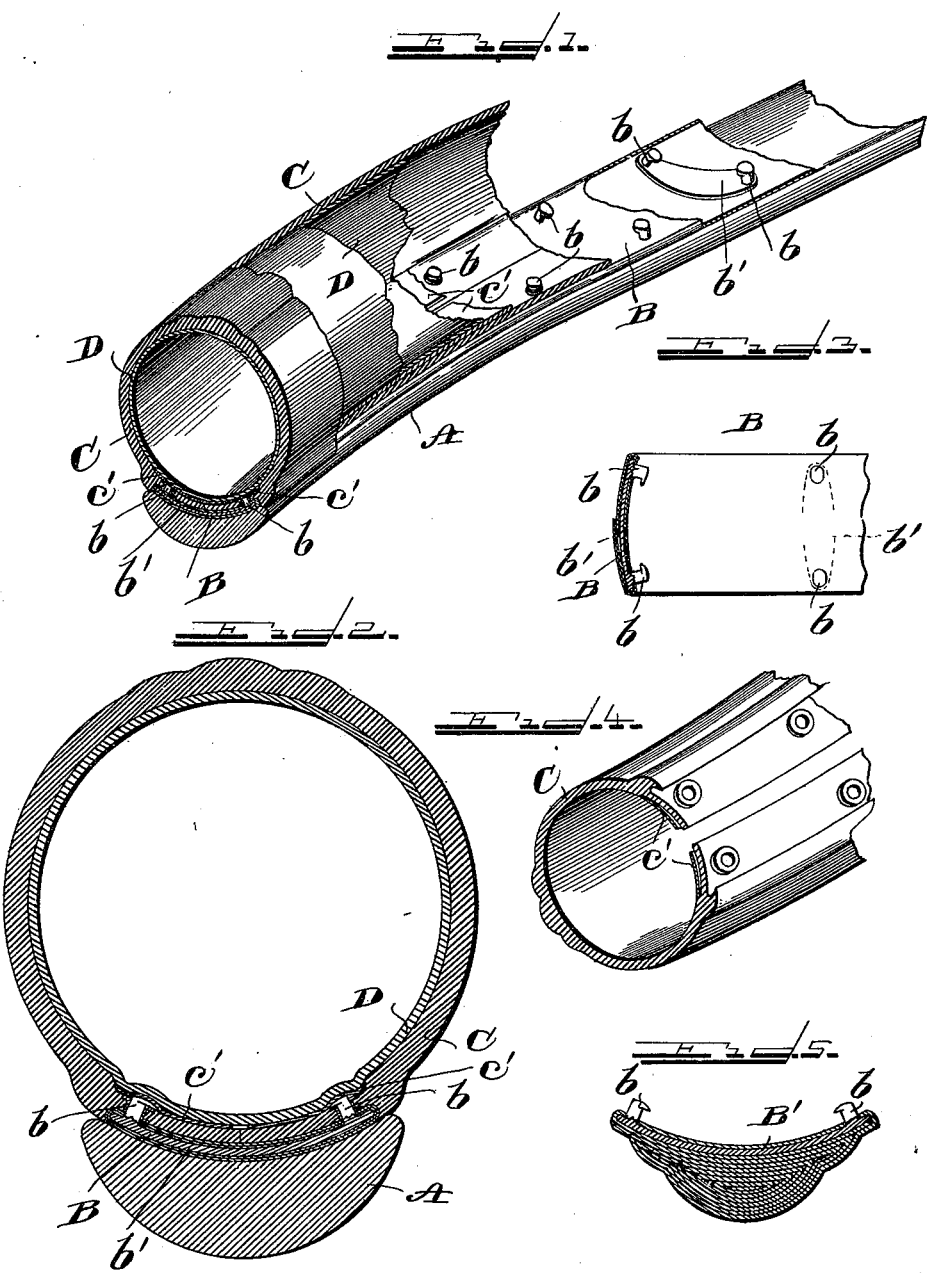

UNITED STATES PATENT OFFICE.

HUGH L. WARNER, OF DAYTON, OHIO, ASSIGNOR TO ALDEN D. CLARK, OF SAME PLACE.

PNEUMATIC TIRE FOR VEHICLES.

SPECIFICATION forming part of Letters Patent No. 672,073, dated April 16, 1901.

Application filed September 27, 1900. Serial No. 31,237. (No model.)

*To all whom it may concern:*

Be it known that I, HUGH L. WARNER, a citizen of the United States, residing at Dayton, in the county of Montgomery and State of Ohio, have invented certain new and useful Improvements in Pneumatic Tires for Vehicles; and I do hereby declare that the following is a full, clear, and exact description thereof, reference being had to the accompanying drawings, and to the letters of reference marked thereon, which form a part of this specification.

This invention relates to improvements in pneumatic tires for vehicles, and more particularly to tires of that class in which an inner inflatable tube is inclosed within an outer casing detachably secured to the rim of a wheel.

The invention consists in the matters hereinafter described, and more fully pointed out and defined in the appended claims.

In the drawings, Figure 1 is a fragmentary perspective view of a tire embodying my invention, showing the same as attached to a wheel-rim. Fig. 2 is an enlarged cross-section of the same. Fig. 3 is a view of a flexible strip forming part of the attaching means. Fig. 4 is a fragmentary perspective view of the outer casing. Fig. 5 is a view in cross-section of a modification of the attaching-strip.

In the drawings, A indicates a wheel-rim of any desired construction.

B indicates a flexible strip or band provided adjacent to both edges with studs $b\ b$ and secured circumferentially on the rim.

C indicates the outer casing, adapted to be secured by its edges to the studs $b\ b$ and to inclose the inflatable inner tube D.

The flexible strip B, as shown, consists of a strip of fabric coated on one side with cementing material, such as rubber or the like and folded longitudinally, as illustrated in Figs 2 and 3, with the cemented surfaces turned inwardly and inclosing transverse struts $b'\ b'$. Said struts are spaced equal distances apart and are each provided at each end with an integral stud $b$, which projects through the upper surface of the strip, as indicated in Fig. 1, and affords means for attaching thereto the outer casing C. Said studs $b\ b$ are, as shown, slightly upset at their outer ends, at the inner side thereof, thereby providing a slight lateral projection at the top of each stud, which aids in retaining the outer casing in place. The tread-surface of wheel-rims as ordinarily constructed are cylindrically concave in cross-section, and when rims are so constructed the strip, as described, may be nailed, screwed, cemented, or otherwise secured to said rim. If, however, the surface of the rim is not cylindrically concave in cross-section, the under side of the strip may be adapted to fit in the rim by providing a backing of fabric or other desired material of the proper shape, as indicated in Fig. 5, which illustrates a form suitable for use for the Dunlop rim.

The outer casing C consists of an endless tube of rubber or other suitable material of a desired size slit circumferentially on its inner side and provided along its slit edges with eyelets $c$, spaced to correspond with the studs on the flexible strip B and adapted to engage the same. On the inner side of said casing a reinforcing-strip $c'$ is secured adjacent to each of said edges and covering said eyelets, as indicated in Fig. 2. Said reinforcing-strips are adapted not only to strengthen the cut edges of said casing, but also to act to prevent the heads of said studs from coming in contact with and chafing the inner tube D. The outer covering of rubber of said casing extends to a point adjacent to said eyelets and terminates on each side in a flap or fold $c^2$, adapted when the casing is secured upon the rim, as indicated in Fig. 2, to form a contact-surface with the rim and the edges of the flexible strip considerably increasing the thickness of said casing at said point and acting as a rub-surface to prevent chafing of the casing on the rim.

The operation of my device is as follows: The flexible strip B is first secured on the tread-surface of the rim circumferentially thereof, with the studs $b\ b$ projecting outwardly, as indicated in Fig. 1. One edge of the casing is then secured on the studs on one side of said rim and the inflatable tube D is placed therein. The other edge of said casing is then secured upon the remaining studs, thereby drawing the edges of said casing together and forming a continuous outer tube inclosing the inflatable tube. Said inner tube is now inflated in the usual manner to the desired tension, with the effect of expanding the outer casing and firmly securing the same in contact with the rim, as indicated in Fig. 2. Obviously many details of construction may be modified without departing from the spirit of my invention.

I claim as my invention—

1. A detachable tire for vehicle-wheels comprising a flexible strip provided on one side with studs and adapted to be secured circumferentially on the wheel, an inner tube and an outer casing inclosing said inner tube and provided at its edges with eyelets adapted to engage said studs.

2. In a detachable tire for vehicle-wheels a strip of fabric coated on one side with adhesive material and folded longitudinally with the coated surface turned inwardly, struts secured transversely between the folds and provided at each end with a stud projecting through the fabric.

3. A vehicle-tire comprising a flexible strip adapted to be secured circumferentially of a wheel-rim and provided along each edge with studs rigidly connected in pairs, an inflatable tube, an outer casing comprising an annular band of fabric provided adjacent to each edge with eyelets adapted to engage said studs and forming when secured thereon a continuous tube inclosing said inflatable tube, each of said eyelets being closed on its inner side.

4. In a device of the class described, an outer casing comprising an endless strip of fabric provided adjacent to its edges with eyelets adapted to engage studs secured along the circumference of a wheel-rim and forming when so secured a continuous tube, a strip of fabric secured along each edge on the inner side of said casing and covering said eyelets and resilient flaps or folds on the outer side of said casing adjacent to the eyelets and adapted when said outer casing is secured upon the wheel-rim to form a cushion between the casing and the rim.

5. In a detachable vehicle-tire the combination with a wheel-rim of a strip of fabric narrower than the wheel-rim and secured centrally and circumferentially thereof, said strip being provided with studs equally spaced upon the outer side of the rim, said studs being connected in pairs on opposite sides of the strip, an outer casing comprising a continuous band of fabric provided adjacent to its edges with eyelets adapted to engage said studs and forming when so engaged an endless tube, a strip of fabric covering said eyelets on the inner side of the casing and longitudinal resilient folds or flaps integral with the casing adjacent to said eyelets, said folds or flaps engaging the edges of the rim and strip and acting to prevent wear on the outer casing.

In testimony whereof I have hereunto subscribed my name in the presence of two subscribing witnesses.

HUGH L. WARNER.

In presence of—
C. K. McCONNAUGHEY,
JNO. C. CRUME.